US012771492B2

(12) United States Patent
Wu

(10) Patent No.: US 12,771,492 B2
(45) Date of Patent: Oct. 20, 2026

(54) METHOD, APPARATUS, DEVICE AND STORAGE MEDIUM FOR TRANSMITTING AUDIO

(71) Applicant: Douyin Vision Co., Ltd., Beijing (CN)

(72) Inventor: Canrui Wu, Beijing (CN)

(73) Assignee: DOUYIN VISION CO., LTD., Beijing (CN)

( * ) Notice: Subject to any disclaimer, the term of this patent is extended or adjusted under 35 U.S.C. 154(b) by 0 days.

(21) Appl. No.: 18/807,771

(22) Filed: Aug. 16, 2024

(65) Prior Publication Data

US 2025/0062865 A1 Feb. 20, 2025

(30) Foreign Application Priority Data

Aug. 18, 2023 (CN) ......................... 202311049306.1

(51) Int. Cl.
*H04L 1/1867* (2023.01)

(52) U.S. Cl.
CPC ............ *H04L 1/189* (2013.01); *H04L 1/1887* (2013.01)

(58) Field of Classification Search
CPC ..... H04L 1/189; H04L 1/1887; H04L 1/1825; H04L 65/60; H04L 1/004; H04L 1/1812
(Continued)

(56) References Cited

U.S. PATENT DOCUMENTS 6,405,337 B1 * 6/2002 Grohn ....................... H04L 1/18 714/749
9,232,296 B2 * 1/2016 Gudiksen ............. H04R 1/1091
(Continued)

FOREIGN PATENT DOCUMENTS

CN 101252425 A 8/2008
CN 114039703 A 2/2022
(Continued)

OTHER PUBLICATIONS

Office Action for Chinese Patent Application No. 202311049306.1, mailed on May 28, 2026, 8 pages.
(Continued)

*Primary Examiner* — Albert Decady
*Assistant Examiner* — Osman M Alshack
(74) *Attorney, Agent, or Firm* — Astute IP Law Group

(57) ABSTRACT

The embodiment provides a method, an apparatus, a device and a storage medium for transmitting audio. The method includes: determining a target number of retransmissions corresponding to current target audio to be transmitted, based on a current network packet loss rate and an audio packet anti-loss rate; determining a current allowed number of responses corresponding to a retransmission mode of a negative acknowledgement, based on a current network round-trip delay and a predetermined allowed delay; determining a target number of redundancies corresponding to a forward redundancy retransmission mode and a target retransmission delay corresponding to the retransmission mode of the negative acknowledgment, based on the target number of retransmissions, the predetermined allowed delay, the current allowed number of responses, and an allowed number of redundancies corresponding to a forward redundancy retransmission mode; and transmitting the target audio based on the target number of redundancies and the target retransmission delay.

16 Claims, 3 Drawing Sheets

(58) Field of Classification Search
USPC .................................................. 714/748–750
See application file for complete search history.

(56) References Cited

U.S. PATENT DOCUMENTS

| | | | | |
|---|---|---|---|---|
| 2006/0041815 | A1* | 2/2006 | Haymond | H04L 1/1835 714/748 |
| 2006/0258291 | A1* | 11/2006 | Nakata | H04N 19/166 455/67.11 |
| 2009/0310493 | A1* | 12/2009 | Nogami | H04L 1/205 714/751 |
| 2012/0218900 | A1* | 8/2012 | Michaelis | H04L 65/1016 370/352 |
| 2013/0243219 | A1* | 9/2013 | Zeng | H04L 1/1887 381/77 |
| 2021/0219075 | A1* | 7/2021 | El-Hoiydi | H04R 25/502 |
| 2023/0336904 | A1* | 10/2023 | Cheong | H04R 1/1041 |
| 2023/0421626 | A1* | 12/2023 | Zhong | H04L 1/16 |
| 2025/0023670 | A1* | 1/2025 | Doss | H04L 1/1854 |

FOREIGN PATENT DOCUMENTS

| | | | | |
|---|---|---|---|---|
| CN | 114158089 A | * | 3/2022 | G10L 19/0017 |
| CN | 115001632 A | | 9/2022 | |
| CN | 115549863 A | | 12/2022 | |
| CN | 116094661 A | | 5/2023 | |

OTHER PUBLICATIONS

Notice of Allowance for Chinese Patent Application No. 202311049306.1, mailed on Aug. 25, 2026, 6 pages.
Zhou et al., "Error Resilience Techniques for Video Communication based H.264/AVC", Chinese Journal of Computers, vol. 29, No. 2, Feb. 12, 2006, 6 pages, with English Abstract.

* cited by examiner

METHOD, APPARATUS, DEVICE AND STORAGE MEDIUM FOR TRANSMITTING AUDIO

CROSS-REFERENCE

The present application claims priority to Chinese Patent Application No. 202311049306.1, filed on Aug. 18, 2023 and entitled "METHOD, APPARATUS, DEVICE AND STORAGE MEDIUM FOR TRANSMITTING AUDIO", the entirety of which is incorporated herein by reference.

FIELD

Embodiments of the present disclosure relate to the field of computer technologies, and in particular, to a method, an apparatus, a device, and a storage medium for transmitting audio.

BACKGROUND

During real-time communication, audio may experience packet loss due to network interference, requiring the recovery of lost data to ensure the listening experience of the audio. Currently, it is common to use forward error correction to send redundant data packets for weak network countermeasure. However, although the recovery delay may be reduced, the redundancy of data transmission may be increased. It can be seen that there is currently an urgent need for an audio transmission mode that can effectively balance recovery delay and redundancy:

SUMMARY

The disclosure provides a method, an apparatus, a device, and a storage medium for transmitting audio, so that the recovery delay and redundancy are effectively balanced. Thus, the redundancy is reduced while the low delay requirement is met, and the weak network countermeasure effect is ensured.

According to a first aspect, an embodiment of the present disclosure provides a method for transmitting audio, comprising:

- determining a target number of retransmissions corresponding to current target audio to be transmitted, based on a current network packet loss rate and an audio packet anti-loss rate;
- determining a current allowed number of responses corresponding to a retransmission mode of a negative acknowledgement, based on a current network round-trip delay and a predetermined allowed delay;
- determining a target number of redundancies corresponding to a forward redundancy retransmission mode and a target retransmission delay corresponding to the retransmission mode of the negative acknowledgment, based on the target number of retransmissions, the predetermined allowed delay; the current allowed number of responses, and an allowed number of redundancies corresponding to a forward redundancy retransmission mode; and
- transmitting the target audio based on the target number of redundancies and the target retransmission delay.

According to a second aspect, an embodiment of the present disclosure provides an apparatus for transmitting audio, comprising:

- a target retransmission number determining module, configured to determine a target number of retransmissions corresponding to current target audio to be transmitted, based on a current network packet loss rate and an audio packet anti-loss rate;
- an allowed number of responses determining module, configured to determine a current allowed number of responses corresponding to a retransmission mode of a negative acknowledgement, based on a current network round-trip delay and a predetermined allowed delay;
- a retransmission information determining module, configured to determine a target number of redundancies corresponding to a forward redundancy retransmission mode and a target retransmission delay corresponding to a retransmission mode of the negative acknowledgment, based on the target number of retransmissions, the predetermined allowed delay, the current allowed number of responses, and the allowed number of redundancies corresponding to a forward redundancy retransmission mode; and
- a target audio transmitting module, configured to transmit the target audio based on the target number of redundancies and the target retransmission delay:

According to a third aspect, an embodiment of the present disclosure provides an electronic device, comprising:

- one or more processors;
- a storage device storing one or more programs;
- the one or more programs, when executed by the one or more processors, causing the one or more processors implement the method for transmitting audio according to any embodiments of this disclosure.

According to a fourth aspect, an embodiment of the present disclosure provides a storage medium comprising computer-executable instructions, wherein the computer-executable instructions, when executed by a computer processor, perform the method for transmitting audio according to any embodiments of this disclosure.

According to the embodiment of the disclosure, a target number of retransmissions corresponding to current target audio to be transmitted is determined based on a current network packet loss rate and an audio packet anti-loss rate; a current allowed number of responses corresponding to a retransmission mode of a negative acknowledgement is determined based on a current network round-trip delay and a predetermined allowed delay; a target number of redundancies corresponding to a forward redundancy retransmission mode and a target retransmission delay corresponding to the retransmission mode of the negative acknowledgment are determined based on the target number of retransmissions, the predetermined allowed delay, the current allowed number of responses, and an allowed number of redundancies corresponding to a forward redundancy retransmission mode; and the target audio is transmitted based on the target number of redundancies and the target retransmission delay. It can effectively control the redundancy of target audio transmission. Further, transmitting target audio based on target retransmission delay can effectively control the number of negative response retransmissions, thus meeting low delay requirements. By combining forward redundancy retransmission and negative response retransmission, it can effectively balance recovery delay and redundancy, thereby reducing redundancy while meeting low delay requirements and ensuring weak network countermeasure effects.

BRIEF DESCRIPTION OF DRAWINGS

The above and other features, advantages, and aspects of various embodiments of the present disclosure will become more apparent from the following detailed description taken in conjunction with the accompanying drawings. Throughout the drawings, the same or similar reference numbers refer to the same or similar elements. It should be understood that the drawings are schematic, and elements and components are not necessarily drawn to scale.

DETAILED DESCRIPTION

Figure 1:
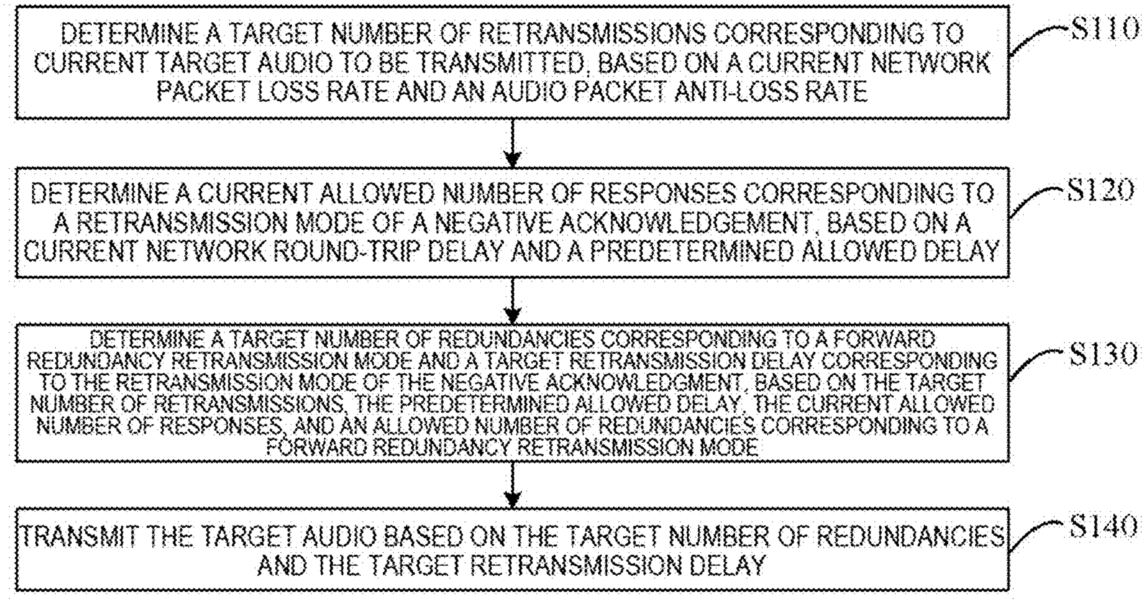
FIG. 1 is a schematic flowchart of a method for transmitting audio according to an embodiment of the present disclosure.

Embodiments of the present disclosure will be described in more detail below with reference to the accompanying drawings. While certain embodiments of the present disclosure are shown in the drawings, it is to be understood that the present disclosure may be implemented in various forms, and should not be construed as limited to the embodiments set forth herein. Rather, these embodiments are provided for a more thorough and complete understanding of the present disclosure. It should be understood that the drawings and embodiments of the present disclosure are for exemplary purposes only and are not intended to limit the scope of the present disclosure.

It should be understood that the steps recited in the method embodiments of the present disclosure may be performed in different orders, and/or in parallel. Further, the method embodiments may include additional steps and/or omit performing the illustrated steps. The scope of the present disclosure is not limited in this respect.

As used herein, the term "comprises" and variation thereof are open-ended, i.e., "comprises but not limited to". The term "based on" means "based at least in part on". The term "one embodiment" means "at least one embodiment"; the term "another embodiment" means "at least one further embodiment"; and the term "some embodiments" means "at least some embodiments". The relevant definition of other terms will be given below.

It should be noted that terms such as "first" and "second" mentioned in this disclosure are merely used to distinguish different apparatuses, modules, or units, and are not intended to limit the order of functions performed by the apparatuses, modules, or units or the mutual dependency relationship.

It should be noted that the modification of "a" and "a plurality" mentioned in this disclosure is illustrative and not limiting, and those skilled in the art should understand that they means "one or more" unless the context clearly indicates otherwise.

The names of messages or information interacted between a plurality of devices in embodiments of the present disclosure are for illustrative purposes only, and are not intended to limit the scope of such messages or information.

FIG. 1 is a schematic flowchart of a method for transmitting audio according to an embodiment of the present disclosure. The embodiment of the present disclosure is applicable to a situation in which an audio is transmitted in real-time communication. The method may be executed by an apparatus for transmitting audio, which may be implemented in the form of software and/or hardware, optionally, by an electronic device. The electronic device may be a mobile terminal, PC or server and the like.

As shown in FIG. 1, the method for transmitting audio specifically comprises the following steps:

S110: determine a target number of retransmissions corresponding to current target audio to be transmitted, based on a current network packet loss rate and an audio packet anti-loss rate.

The current network packet loss rate may be a loss ratio of sending a data packet in a current network situation. The current network packet loss rate may be obtained through testing current network. The audio packet anti-loss rate may refer to a maximum packet anti-loss rate that the audio codec itself may have. The audio codec may utilize packet loss concealment (PLC) and in-band redundancy mechanisms to obtain the same audio experience without completely recovering lost audio packets. In other words, when the packet loss rate is less than or equal to the packet anti-loss rate of the audio, the lost data packets need not to be continuously recovered. The normal encoding and decoding can be directly performed by using the PLC and the in-band redundancy mechanism, to obtain audio with the same sound quality, and the audio quality is not affected. The target audio may refer to any audio stream that needs to be transmitted by the current network. The target number of retransmissions may refer to the number that packet needs to be retransmitted when the packet loss rate is less than or equal to the packet anti-loss rate of the audio in the current network. The target number of retransmissions may also refer to the number that the packet needs to be retransmitted so that the target audio can be encoded and decoded normally.

Specifically, if the current network packet loss rate is x, the audio packet anti-loss rate is r, and target number of retransmissions corresponding to target audio is k, there is the following relationship: $x^{k+1} \leq r < x^k$. The packet loss rate of k retransmissions is less than or equal to the audio packet anti-loss rate, and the packet loss rate of k−1 retransmissions is greater than the audio packet anti-loss rate. Based on $x^{k+1}=r$, $k=[\log(r)/\log(x)]-1$ may obtained, thus the target number of retransmissions k corresponding to the target audio to be transmitted are determined. It should be noted that the number of retransmissions refers to the number that the audio is transmitted again after the first transmission, and does not include the first transmission.

S120: determine a current allowed number of responses corresponding to a retransmission mode of a negative acknowledgement, based on a current network round-trip delay and a predetermined allowed delay.

The current network round-trip delay RTT (Round-Trip Time) may be a delay experienced by sending data from the sender to receiving an acknowledgement returned by the receiver in a current network situation. The predetermined allowed delay may be an allowed maximum delay set by the user in advance based on the service requirement. The predetermined allowed delay may be a maximum delay that is not perceived by the user (that is, the first allowed delay), or may be a maximum delay that can be perceived by the user but acceptable (that is, the second allowed delay). The retransmission mode of a negative acknowledgement may be that the lost data packet is retransmitted when the sender receives a negative acknowledgement NACK signal, and the negative acknowledgement NACK signal is feedback signal generated based on the packet loss information when the receiver finds out data packet lost, to make sender to only retransmit the lost packets. The current allowed number of responses may be the maximum number a negative acknowledgement response can be made within the predetermined allowed delay.

Specifically, the single response duration may be determined based on the current network round-trip delay and the predetermined sending interval. For example, the current network round-trip delay is added to the predetermined sending interval, and the obtained addition result is used as the single response duration. The predetermined allowed delay may be divided by a single response duration, and the division result is rounded to obtain the current allowed number of responses corresponding to the retransmission mode of a negative acknowledgement.

S130: determine a target number of redundancies corresponding to a forward redundancy retransmission mode and a target retransmission delay corresponding to the retransmission mode of the negative acknowledgment, based on the target number of retransmissions, the predetermined allowed delay, the current allowed number of responses, and an allowed number of redundancies corresponding to a forward redundancy retransmission mode.

The forward redundancy retransmission mode may be a mode in which the sender sends redundant data in advance. In the forward redundancy retransmission mode, the redundant data may be sent when the sender first transmits the audio data packet. The forward redundancy retransmission mode may also delay sending redundant data until the negative response signal is received for the first time. At this time, the forward redundancy retransmission mode is a delayed forward redundancy retransmission mode. The allowed number of redundancies may be a maximum number of redundancies allowed by a forward retransmission set based on a service requirement in advance, to control redundancy. For example, the allowed number of redundancies may be 4.

The target number of redundancies corresponding to a forward redundancy retransmission mode may refer to a number that a data packet of the target audio needs redundancy. For example, if there are 10 data packets in the target audio and the target number of redundancies are 2, it indicates that each data packet of the target audio needs to be redundant processed 2 times, that is, each data packet needs to be transmitted 3 times when the sender starts to transmit the target audio. The target number of redundancies are greater than or equal to 0 and less than or equal to the allowed number of redundancies. The target retransmission delay corresponding to the retransmission mode of the negative acknowledgment may refer to a maximum retransmission delay allowed by the target audio in the negative acknowledgment retransmission process, to control the number of negative acknowledgment retransmissions, thereby meeting a low delay requirement. The target retransmission delay is less than or equal to the predetermined allowed delay. The forward redundancy retransmission mode is an active retransmission mode. The negative acknowledgement retransmission mode is a passive retransmission mode.

Specifically, based on the target number of retransmissions, the predetermined allowed delay, the current allowed number of responses, and an allowed number of redundancies corresponding to a forward redundancy retransmission mode, the redundancy minimization may be performed under the low delay requirement, the minimum target number of redundancies and the target retransmission delay meeting the low delay requirement can be determined, so that the recovery delay and redundancy can be effectively balanced, and the redundancy performance overhead is reduced while the weak network countermeasure effect is ensured.

S140: transmit the target audio based on the target number of redundancies and the target retransmission delay.

Specifically, the target audio is first transmitted, and the active retransmission of forward redundancy is performed on the target audio based on the target number of redundancies during the first transmission or after the first transmission, and the passive retransmission of the lost data packet is controlled based on the target retransmission delay when the negative acknowledgement signal returned by the receiver is received, so that the number of passive retransmissions can be controlled, and the target retransmission delay is avoided, thereby meeting the requirement of low delay.

According to the technical scheme of the embodiment of the disclosure, a target number of retransmissions corresponding to current target audio to be transmitted is determined based on a current network packet loss rate and an audio packet anti-loss rate; a current allowed number of responses corresponding to a retransmission mode of a negative acknowledgement is determined based on a current network round-trip delay and a predetermined allowed delay; a target number of redundancies corresponding to a forward redundancy retransmission mode and a target retransmission delay corresponding to the retransmission mode of the negative acknowledgment are determined based on the target number of retransmissions, the predetermined allowed delay, the current allowed number of responses, and an allowed number of redundancies corresponding to a forward redundancy retransmission mode; and the target audio is transmitted based on the target number of redundancies and the target retransmission delay. It can effectively control the redundancy of target audio transmission. Further, transmitting target audio based on target retransmission delay can effectively control the number of negative response retransmissions, thus meeting low delay requirements. By combining forward redundancy retransmission and negative response retransmission, it can effectively balance recovery delay and redundancy, thereby reducing redundancy while meeting low delay requirements and ensuring weak network countermeasure effects.

On the basis of the above technical solution, S140 may comprise: performing redundancy processing on an audio data packet of the target audio based on the target number of redundancies, and transmitting the audio data packet with redundancies; and in response to the current transmission delay being less than or equal to the target retransmission delay, retransmitting a lost audio data packet responsive to a received negative acknowledgement signal.

Specifically, redundant processing is performed on each audio data packet of the target audio based on the target number of redundancies, and the redundant audio data packets are transmitted. For example, the target audio comprises 10 data packets, and the target number of redundancies is 2. In this case, each audio data packet may be continuously transmitted 3 times during the first transmission. One data packet is transmitted for 3 times, then the next data packet is transmitted; or 10 data packets of the entire target audio may be transmitted 3 times as one group. It should be noted that, if the target number of redundancies is 0, it indicates that forward redundancy needs not to be performed, and redundancy is 0. At this time, only all data packets of the target audio may be transmitted once for the first transmission, and no redundant data needs to be sent.

When receiving the target audio sent by the sender, if the receiver finds a packet loss, a negative acknowledgement signal may be generated based on the packet loss information and returned to the sender. The sender may detect whether the current transmission delay of the target audio is less than or equal to the target retransmission delay in real time. If yes, it indicates that the low delay requirement is still met, and at this time, the lost audio data packet may be retransmitted in response to the received negative acknowledgement signal. If it is detected that the current transmission delay of the target audio is greater than the target retransmission delay, it indicates that the low delay requirement is not currently satisfied, at this time, the response to received negative acknowledgement signals is forbidden, passive retransmission operations are stopped, and the transmission of target audio is ended, to meet low delay requirements.

For example, retransmitting the lost audio data packet responsive to the received negative acknowledgement signal may comprise: in response to a firstly received negative acknowledgement signal, performing redundancy processing on the lost audio data packet, based on the target number of redundancies corresponding to the delay forward redundancy retransmission mode, and retransmitting the lost audio data packet with redundancies; and in response to a subsequently received negative acknowledgement signal, retransmitting the lost audio data packet.

Specifically, if the target number of redundancies corresponding to the forward redundancy retransmission mode is equal to 0, and the target number of redundancies corresponding to the delay forward redundancy retransmission mode is not equal to 0, it indicates that the forward redundancy retransmission is delayed, and redundancy retransmission of the lost data packet is performed only when the negative acknowledgment signal is received for the first time, so that the lost data packet can be redundant more times when the overall redundancy is unchanged, thereby improving recovery efficiency.

Figure 2:
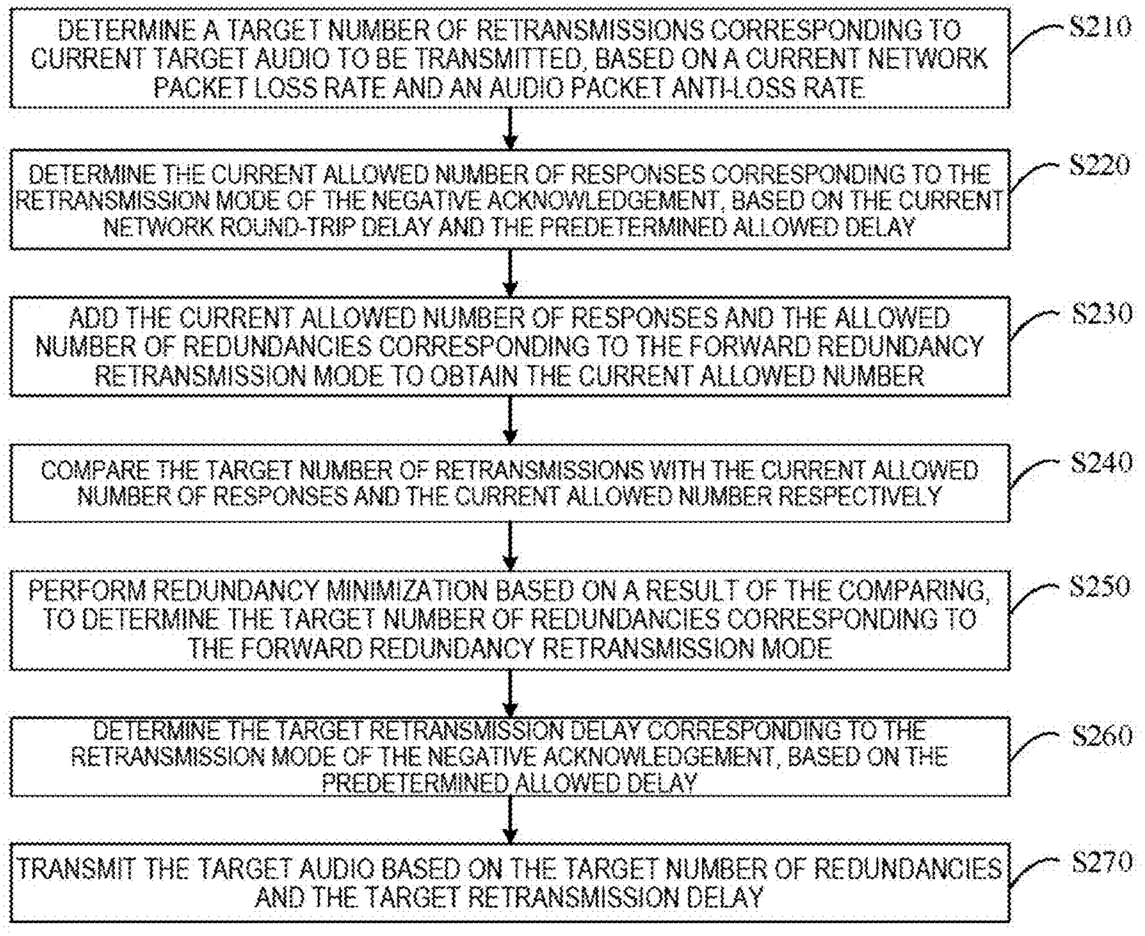
FIG. 2 is a schematic flowchart of another method for transmitting audio according to an embodiment of the present disclosure.

FIG. 2 is a schematic flowchart of another method for transmitting audio according to an embodiment of the present disclosure. On the basis of the above disclosed embodiments, this disclosure provides a detailed description of the process of determining the target number of redundancies and target retransmission delay under only one predetermined allowed delay being configured. The explanation of the same or corresponding terms as the above disclosed embodiments will not be repeated here.

As shown in FIG. 2, the method for transmitting audio specifically comprises the following steps:

S210: determine a target number of retransmissions corresponding to current target audio to be transmitted, based on a current network packet loss rate and an audio packet anti-loss rate.

S220: determine a current allowed number of responses corresponding to a retransmission mode of a negative acknowledgement, based on a current network round-trip delay and a predetermined allowed delay.

The predetermined allowed delay may be a predetermined maximum delay perceived by a user (that is, the first allowed delay), so as to meet a relatively high low-delay requirement, and does not affect the listening experience of the user. For example, the predetermined allowed delay may be 300 ms, that is, the user does not perceive the audio delay within 300 ms. Alternatively, the predetermined allowed delay may also be a maximum delay (that is, the second allowed delay) that can be perceived by the user but acceptable, so as to meet the relatively low low-delay requirement, improve the audio recovery effect, and ensure the audio listening quality. For example, the predetermined allowed delay may also be Is, that is, the user can perceive the audio delay within the delay of is but is within an acceptable range. The smaller the predetermined allowed delay set, the higher the low-delay requirement for audio transmission.

Specifically, the current network round-trip delay RTT is added to a predetermined sending interval (for example, 30), and the obtained adding result is used as a single response duration. Dividing the predetermined allowed delay by a single response duration, and rounding the division result, the obtained integer is the current allowed number of responses corresponding to the retransmission mode of negative acknowledgement.

S230: add the current allowed number of responses and the allowed number of redundancies corresponding to the forward redundancy retransmission mode to obtain the current allowed number.

Specifically, the current allowed number refers to an addition result of current allowed number of responses and the allowed number of redundancies. The current allowed number of responses refers to a maximum number of retransmissions allowed by passive retransmission (that is, a negative acknowledgement retransmission mode) in an audio transmission process. The allowed number of redundancies refers to the maximum number of retransmissions allowed in an active retransmission (that is, a forward redundancy retransmission mode) in an audio transmission process. The current allowed number may be used to represent a maximum total number of retransmissions allowed for active retransmission and passive retransmission in an audio transmission process.

S240: compare the target number of retransmissions with the current allowed number of responses and the current allowed number respectively.

Specifically, the target number of retransmissions is compared with the current allowed number of responses, and the target number of retransmissions is compared with the current allowed number, to determine whether the retransmission may be performed only by using a negative acknowledgment retransmission mode when the low delay requirement is met, or may be retransmitted in combination with a negative acknowledgment retransmission mode and a forward redundancy retransmission mode.

For example, the comparison result may be divided into three cases by using the current allowed number of responses and the current allowed number, and the first case is that the target number of retransmissions is less than or equal to the current allowed number of responses; the second case is that the target number of retransmissions is greater than the current allowed number of responses and less than or equal to the current allowed number; and the third case is that the target number of retransmissions is greater than the current allowed number.

S250: perform redundancy minimization based on a result of the comparing, to determine the target number of redundancies corresponding to the forward redundancy retransmission mode.

Specifically, based on the comparison result corresponding to the target number of retransmissions, the number of forward redundancy is minimized to obtain the minimum target number of redundancies when the low delay requirement is met, so that redundancy can be reduced as much as possible, and the overhead of redundancy performance is reduced while the weak network countermeasure effect is ensured.

For example, S250 may comprises: in response to the target number of retransmissions being less than or equal to the current allowed number of responses, determining that the target number of redundancies corresponding to the forward redundancy retransmission mode is 0; in response to the target number of retransmissions being greater than the current allowed number of responses and less than or equal to the current allowed number, determining, based on the target number of retransmissions and the current allowed number of responses, the target number of redundancies corresponding to the forward redundancy retransmission mode; in response to the target number of retransmissions being greater than the current allowed number, determining that the target number of redundancies corresponding to the forward redundancy retransmission mode based on the current allowed number of responses and allowed number of redundancies.

Specifically, when the target number of retransmissions is less than or equal to the current allowed number of responses, that is, in the first case, it indicates that the audio recovery can be achieved only by using the negative acknowledgement retransmission mode, and the low delay requirement can be me. At this time, the target number of redundancies can be determined as the minimum value 0, and forward redundancy retransmission does not need to be performed. When the target number of retransmissions is greater than the current allowed number of responses and less than or equal to the current allowed number, that is, in the second case, it indicates that the target number of retransmissions cannot be reached only by using the negative acknowledgement retransmission mode, but the negative acknowledgement retransmission mode and the forward redundancy retransmission mode need to be combined to achieve the target number of retransmissions, thus the audio may be recovered. At this time, the target number of retransmissions may be subtracted by the current allowed number of responses, and the obtained difference is determined as the target number of redundancies, so that the number of negative acknowledgement is maximized, and the number of redundancies is minimized. When the target number of retransmissions is greater than the current allowed number, that is, in the third case, it indicates that the target number of retransmissions cannot be achieved by combination of negative acknowledgment retransmission mode and the forward redundancy retransmission mode. At this time, it may be determined, based on the current allowed number of responses, whether to delay the forward redundancy retransmission, to determine the target number of redundancies that are more satisfactory.

For example, determining the target number of redundancies corresponding to the forward redundancy retransmission mode based on the current allowed number of responses and the allowed number of redundancies may comprise: in response to the current allowed number of responses being less than or equal to the predetermined number, determining that the target number of redundancies corresponding to the forward redundancy retransmission mode is the allowed number of redundancies; and in respond to the current allowed number of responses being greater than the predetermined number, determining that the target number of redundancies corresponding to the forward redundancy retransmission mode is 0, and determining, based on the allowed number of redundancies and the current network packet loss rate, the target number of redundancies corresponding to the delay forward redundancy retransmission mode.

The delay forward redundancy retransmission mode is a mode for performing forward redundancy retransmission after the negative acknowledgement signal is received for the first time, that is, the forward redundancy retransmission is delayed to perform from the first transmission to the first reception of the negative acknowledgement signal. The predetermined number may be set in advance based on a service requirement, and represents a number of responses corresponding to enough negative acknowledgement response time. For example, the predetermined number may be 0, or may be an integer greater than 0, for example, the predetermined number is 2.

Specifically, when the current allowed number of responses is less than or equal to the predetermined number, it indicates that the target number of retransmissions cannot be achieved by the combination of the negative acknowledgement retransmission mode and the forward redundancy retransmission mode, and there is not enough number of responses to support, and at this time, the target number of redundancies can be directly determined as the allowed number of redundancies, so that the lag rate is not considered, and the delay is limited. When the current allowed number of responses is greater than the predetermined number, it indicates that the target number of retransmissions cannot be achieved by the combination of the negative acknowledgement retransmission mode and the forward redundancy retransmission mode, but has enough number of responses to support, and at this time, the forward redundancy retransmission may be delayed, that is, the target number of redundancies corresponding to the forward redundancy retransmission mode is 0 (that is, the forward redundant processing is not performed when the audio is transmitted for the first time), and the target number of redundancies corresponding to the delayed forward redundancy retransmission mode is determined based on the allowed number of redundancies and the current network packet loss rate, so that the retransmission of the target number of redundancies is performed again when the negative acknowledgement signal is received for the first time, thus more lost data packets may be redundant, and the recovery efficiency is further improved.

For example, determining, based on the allowed number of redundancies and the current network packet loss rate, the target number of redundancies corresponding to the delay forward redundancy retransmission mode comprises: dividing the allowed number of redundancies by the current network packet loss rate, and determining an obtained result of the dividing as the target number of redundancies corresponding to the delay forward redundancy retransmission mode.

Specifically, compared with the first transmission, each audio data packet is redundant, the delay forward redundancy retransmission mode can only perform redundancy processing on the lost data packet when the negative acknowledgement signal is received for the first time, so that more lost data packets can be redundant under the condition that the overall redundancy is unchanged, thus the recovery efficiency is improved. For example, the allowed number of redundancies corresponding to the forward redundancy retransmission mode is 4, that is, each audio data packet can only be redundant at most for 4 times, and if there are 10 audio data packets, the overall redundancy is 40 data packets. For the delay forward redundancy retransmission mode, if the current lost data packet is 5, with the overall redundancy is unchanged, the target number of redundancies corresponding to each lost data packet is 8, thereby increasing the number of redundancies compared with 4, so that the audio can be recovered more quickly, and the audio recovery efficiency is improved.

S260: determine the target retransmission delay corresponding to the retransmission mode of the negative acknowledgement, based on the predetermined allowed delay.

Specifically, in order to meet the low delay requirement, the target retransmission delay corresponding to the negative acknowledgment retransmission mode cannot exceed the predetermined allowed delay. In order to minimize the number of redundancies, the target retransmission delay corresponding to the negative acknowledgement retransmission mode may be directly determined as the predetermined allowed delay.

S270: transmit the target audio based on the target number of redundancies and the target retransmission delay.

According to the technical scheme of the embodiment of the disclosure, for the situation that only one predetermined allowed delay is configured, the target number of retransmissions are compared with the current allowed number of responses and the current allowed number respectively, redundancy minimization is carried out based on the comparison result, and the target number of redundancies corresponding to the forward redundancy retransmission mode is determined. The target retransmission delay corresponding to the negative acknowledgement retransmission mode is determined based on the predetermined allowed delay, so that the minimum forward redundancy is added while the low delay requirement is met, thereby ensuring a very small performance overhead while ensuring the weak network countermeasure effect.

Figure 3:
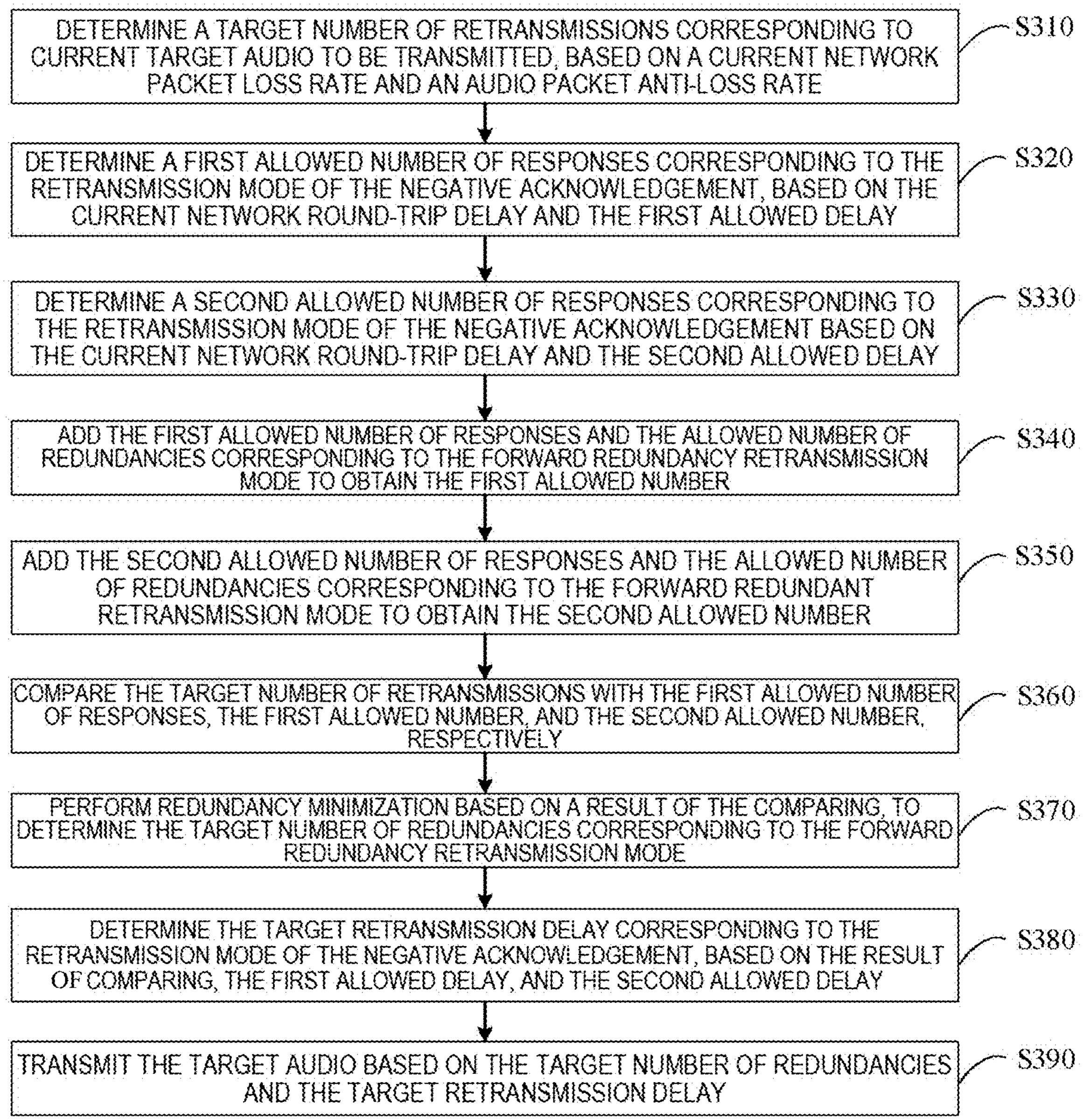
FIG. 3 is a schematic flowchart of still another method for transmitting audio according to an embodiment of the present disclosure.

FIG. 3 is a schematic flowchart of still another method for transmitting audio according to an embodiment of the present disclosure. On the basis of the above disclosed embodiments, the present disclosed embodiment describes in detail the determination of target number of redundancies and target retransmission delay when the predetermined allowed delay comprises two allowed delays: the first allowed delay and the second allowed delay. Explanations of terms that are the same as or corresponding to the foregoing embodiments of the present disclosure are not described herein again.

As shown in FIG. 3, method for transmitting audio specifically comprises the following steps:

S310: determine a target number of retransmissions corresponding to current target audio to be transmitted, based on a current network packet loss rate and an audio packet anti-loss rate.

S320: determine a first allowed number of responses corresponding to the retransmission mode of the negative acknowledgement, based on the current network round-trip delay and the first allowed delay.

The first allowed delay may be a predetermined maximum delay that the user cannot perceive, in order to meet higher low delay requirements without affecting the user listening experience. For example, the first allowed delay may be 300 ms, that is, the user does not perceive the audio delay condition within 300 ms.

Specifically, the current network round-trip delay RTT is added to a predetermined sending interval (for example, 30), and the obtained adding result is used as a single response duration. Dividing the first allowed delay by a single response duration, and rounding the division result, the obtained integer is a maximum allowed number of responses that can be responded within the first allowed delay, that is, the first allowed number of responses.

S330: determine a second allowed number of responses corresponding to the retransmission mode of the negative acknowledgement based on the current network round-trip delay and the second allowed delay.

The second allowed delay may also be a maximum delay that can be perceived by the user but acceptable, so as to meet the low delay requirement, improve the audio recovery effect, and ensure the audio listening quality. For example, the second allowed delay may also be Is, that is, the user can perceive the audio delay within the delay of is but is within an acceptable range. The second allowed delay is greater than the first allowed delay.

Specifically, the current network round-trip delay RTT is added to a predetermined sending interval (for example, 30), and the obtained adding result is used as a single response duration. Dividing the second allowed delay by a single response duration, and rounding the division result, the obtained integer is the maximum allowed number of responses that can be responded within the second allowed delay, that is, the second allowed number of responses.

S340: add the first allowed number of responses and the allowed number of redundancies corresponding to the forward redundancy retransmission mode to obtain the first allowed number.

Specifically, the first allowed number refers to an addition result of the first allowed number of responses and the allowed number of redundancies. The first allowed number of responses refers to the maximum number of retransmissions allowed by the passive retransmission (that is, the negative acknowledgement retransmission mode) in the first allowed delay. The allowed number of redundancies refers to the maximum number of retransmissions allowed in an active retransmission (that is, a forward redundancy retransmission mode) in an audio transmission process. The first allowed number may be used to represent a maximum total number of retransmissions allowed for active retransmission and passive retransmission within the first allowed delay.

S350: add the second allowed number of responses and the allowed number of redundancies corresponding to the forward redundant retransmission mode to obtain the second allowed number.

Specifically, the second allowed number refers to an addition result of the second allowed number of responses and the allowed number of redundancies. The second allowed number of responses refers to the maximum number of retransmissions allowed for passive retransmission within the second allowed delay. The second allowed number may be used to present a maximum total number of retransmissions allowed for active retransmission and passive retransmission within the second allowed delay. Since the second allowed delay is greater than the first allowed delay, the second allowed number is greater than the first allowed number.

S360: compare the target number of retransmissions with the first allowed number of responses, the first allowed number, and the second allowed number, respectively.

Specifically, the target number of retransmissions is compared with the current allowed number of responses, the target number of retransmissions is compared with the first allowed number, and the target number of retransmissions is compared with the second allowed number, to determine whether the retransmission may be performed only by using a negative acknowledgment retransmission mode when the low delay requirement is met, or may be retransmitted in combination with a negative acknowledgment retransmission mode and a forward redundancy retransmission mode.

For example, the comparison result may be divided into four cases by using the first allowed number of responses, the first allowed number, and the second allowed number, and the first case is that the target number of retransmissions is less than or equal to the first allowed number of responses; the second case is that the target number of retransmissions is greater than the first allowed number of responses and less than or equal to the first allowed number; the third case is that the target number of retransmissions is greater than the first allowed number and less than or equal to the second allowed number; and the fourth case is that the target number of retransmissions is greater than the second allowed number. It should be noted that by using the two allowed delays, first allowed delay and the second allowed delay, the comparison result may be further refined, thereby improving the control precision of the audio retransmission and further optimizing the audio recovery effect.

S370: perform redundancy minimization based on a result of the comparing, to determine the target number of redundancies corresponding to the forward redundancy retransmission mode.

Specifically, based on the comparison result corresponding to the target number of retransmissions, the number of forward redundancy is minimized to obtain the minimum target number of redundancies when the low delay requirement is met, so that redundancy can be reduced as much as possible, and the overhead of redundancy performance is reduced while the weak network countermeasure effect is ensured.

For example, S370 may comprises: in response to the target number of retransmissions being less than or equal to the first allowed response number, determining that the target number of redundancies corresponding to the forward redundancy retransmission mode is 0; in response to the target number of retransmissions being greater than the first allowed number of responses and less than or equal to the first allowed number, determining, based on the target number of retransmissions and the first allowed number of responses, the target number of redundancies corresponding to the forward redundancy retransmission mode; in response to the target number of retransmissions being greater than the first allowed number and less than or equal to the second allowed number, determining that the target number of redundancies corresponding to the forward redundancy retransmission mode is the allowed number of redundancies; and in response to the target number of retransmissions being greater than the second allowed number, determining, based on the second allowed number of responses and the allowed number of redundancies, the target number of redundancies corresponding to the forward redundancy retransmission mode.

Specifically, when the target number of retransmissions is less than or equal to the first allowed number of responses, that is, in the first case, it indicates that the audio recovery can be achieved only by using a negative acknowledgment retransmission mode, and the first allowed delay can be met. At this time, the target number of redundancies can be determined as the minimum value 0, and forward redundancy retransmission does not need to be performed. When the target number of retransmissions is greater than the first allowed number of responses and less than or equal to the first allowed number, that is, in the second case, it indicates that the target number of retransmissions cannot be achieved only by using the negative acknowledgement retransmission mode, the negative acknowledgement retransmission mode and the forward redundancy retransmission mode need to be combined to achieve the target number of retransmissions, and the first allowed delay can be met. At this time, the first allowed number of responses may be subtracted from the target number of retransmissions, and the obtained difference is determined as the target number of redundancies, so that the number of negative acknowledgement is maximized, and the number of redundancies is minimized. When the target number of retransmissions is greater than the first allowed number and less than or equal to the second allowed number, that is, in the third case, it indicates that the negative acknowledgment retransmission mode and the forward redundancy retransmission mode are combined to achieve the target number of retransmissions, but cannot meet the first allowed delay, and can only meet the second allowed delay. At this time, it can be determined that the target number of redundancies is allowed number of redundancies, so that the most redundant data is retransmitted as much as possible to reduce the delay. When the target number of retransmissions is greater than the second allowed number, that is, in the fourth case, it indicates that the combination of negative acknowledgment retransmission mode and the forward redundancy retransmission mode cannot achieve the target number of retransmissions. At this time, it may be determined, based on the second allowed number of responses, whether to delay the forward redundancy retransmission, to determine the target number of redundancies that are more satisfactory.

For example, determining, based on the second allowed number of responses and the allowed number of redundancies, the target number of redundancies corresponding to the forward redundancy retransmission mode may comprise: in response to the second allowed number of responses being less than or equal to a predetermined number, determining that the target number of redundancies corresponding to the forward redundancy retransmission mode is the allowed number of redundancies; and in response to the second allowed number of responses being greater than the predetermined number, determining that the target number of redundancies corresponding to the forward redundancy retransmission mode is 0, and determining, based on the allowed number of redundancies and the current network packet loss rate, the target number of redundancies corresponding to a delay forward redundancy retransmission mode.

The delay forward redundancy retransmission mode is a mode for performing a forward redundancy retransmission after a negative acknowledgment signal is received for the first time. That is, the forward redundancy retransmission is delayed from the first transmission to the first reception of the negative acknowledgement signal. The predetermined number may be set in advance based on a service requirement, and represents a number of responses corresponding to enough negative acknowledgement response. For example, the predetermined number may be 0, or may be an integer greater than 0, for example, the predetermined number is 2.

Specifically, when the second allowed number of responses is less than or equal to the predetermined number, it indicates that the combination of the negative acknowledgement retransmission mode and the forward redundancy retransmission mode cannot achieve the target number of retransmissions, and there is not enough number of responses to support, and at this time, the target number of redundancies may be directly determined as the allowed number of redundancies, so that the lag rate is not considered, and the delay is limited. When the second allowed number of responses is greater than the predetermined number, it indicates that the combination of the negative acknowledgement retransmission mode and the forward redundancy retransmission mode cannot achieve the target number of retransmissions, but there are enough number of responses to support, and at this time, the forward redundancy retransmission may be delayed, that is, the target number of redundancies corresponding to the forward redundancy retransmission mode is 0 (that is, the forward redundant processing is not performed when the audio is transmitted for the first time), and the target number of redundancies corresponding to the delay forward redundancy retransmission mode are determined based on the allowed number of redundancies and the current network packet loss rate, so that the target number of redundancies are retransmitted when the negative acknowledgement signal is received for the first time, thus more lost data packets may be redundant, and the recovery efficiency is further improved.

For example, determining, based on the allowed number of redundancies and the current network packet loss rate, the target number of redundancies corresponding to the delay forward redundancy retransmission mode may comprise: dividing the allowed number of redundancies by the current network packet loss rate, and determining an obtained result of the dividing as the target number of redundancies corresponding to the delay forward redundancy retransmission mode.

Specifically, compared with the first transmission, each audio data packet is redundant, the delay forward redundancy retransmission mode can only perform redundancy processing on the lost data packet when the negative acknowledgement signal is received for the first time, so that more lost data packets can be redundant under the condition that the overall redundancy is unchanged, thus the recovery efficiency is improved. For example, the allowed number of redundancies corresponding to the forward redundancy retransmission mode is 4, that is, each audio data packet can only be redundant at most for 4 times, and if there are 10 audio data packets, the overall redundancy is 40 data packets. For the delay forward redundancy retransmission mode, if the current lost data packet is 5, with the overall redundancy is unchanged, the target number of redundancies corresponding to each lost data packet is 8, thereby increasing the number of redundancies compared with 4, so that the audio can be recovered more quickly, and the audio recovery efficiency is improved.

S380: determine the target retransmission delay corresponding to the retransmission mode of the negative acknowledgement, based on the result of the comparing, the first allowed delay, and the second allowed delay.

Specifically, in order to meet the low delay requirement, the target retransmission delay corresponding to the negative acknowledgment retransmission mode cannot exceed the second allowed delay. A specific target retransmission delay may be determined for different comparison results, to reduce delay as much as possible.

For example, S380 may comprise: in response to the target number of retransmissions being less than or equal to the first allowed number, determining that the target retransmission delay corresponding to the retransmission mode of the negative acknowledgment is the first allowed delay; in response to the target number of retransmissions being greater than the first allowed number and less than or equal to the second allowed number, determining the target retransmission delay corresponding to the retransmission mode of the negative acknowledgment, based on the target number of retransmissions, the allowed number of redundancies, and the current network round-trip delay; and in response to the target number of retransmissions being greater than the second allowed number, determining that the target retransmission delay corresponding to the retransmission mode of the negative acknowledgment is the second allowed delay.

Specifically, when the target number of retransmissions are less than or equal to the first allowed number (that is, including the foregoing first case and the second case), it indicates that only using the negative acknowledgment retransmission mode, or the combination of the negative acknowledgment retransmission mode and the forward redundancy retransmission mode, can meet the first allowed delay, and at this time, the target retransmission delay may be directly determined to be the first allowed delay. When the target number of retransmissions is greater than the first allowed number and less than or equal to the second allowed number (that is, the above third case), the negative acknowledgment retransmission mode and the forward redundancy retransmission mode may be combined to be within the second allowed delay, and at this time, the target number of redundancies may be set to the maximum value, and the retransmission delay may be reduced as much as possible, so that the minimum target retransmission delay may be determined based on the target number of retransmissions, the allowed number of redundancies, and the current network round-trip delay. When the target number of retransmissions is greater than the second allowed number (that is, the above fourth case), the combination of the negative acknowledgment retransmission mode and the forward redundancy retransmission mode cannot be within the second allowed delay, and at this time, to meet the low delay requirement, it may be determined that the target retransmission delay is the maximum allowed delay, that is, the second allowed delay.

For example, determining the target retransmission delay corresponding to the retransmission mode of the negative acknowledgment based on the target number of retransmissions, the allowed number of redundancies, and the current network round-trip delay may comprise: determining the retransmission number of the negative acknowledgement based on the target number of retransmissions and the allowed number of redundancies; and determining the target retransmission delay corresponding to the retransmission mode of the negative acknowledgement based on the current network round-trip delay and the retransmission number of negative acknowledgement.

The retransmission number of negative acknowledgement may refer to a minimum number of negative acknowledgment responses when the target number of retransmissions is greater than the first allowed number and less than or equal to the second allowed number (i.e., the above third case). Specifically, the allowed number of redundancies may be subtracted from the target number of retransmissions, and the obtained difference is determined as the retransmissions number of negative acknowledgement. The current network round-trip delay RTT may be added to a predetermined sending interval (for example, 30), and the obtained addition result is used as a single response duration. The retransmissions number of negative acknowledgment is multiplied by the single response duration, the obtained multiplication result is the target retransmission delay corresponding to the negative acknowledgment retransmission mode, thereby reducing the retransmission delay as much as possible, and improving the audio listening experience.

S390: transmit the target audio based on the target number of redundancies and the target retransmission delay.

According to the technical scheme of the embodiment of the disclosure, for the situation that two allowed delays are configured, the target number of retransmissions are compared with the first allowed number of responses, the first allowed number and the second allowed number respectively, the redundancy minimization is carried out based on the comparison result, and the target number of redundancies corresponding to the forward redundancy retransmission mode is determined. The target retransmission delay corresponding to the negative acknowledgement retransmission mode is determined based on the result of comparing, the first allowed delay and the second allowed delay, so that the comparison result can be further refined by utilizing the first allowed delay and the second allowed delay, the minimum forward redundancy is added while the low delay requirement is met, the control precision of the audio retransmission is improved, and the minimum performance overhead is ensured while the weak network countermeasure effect is ensured.

Figure 4:
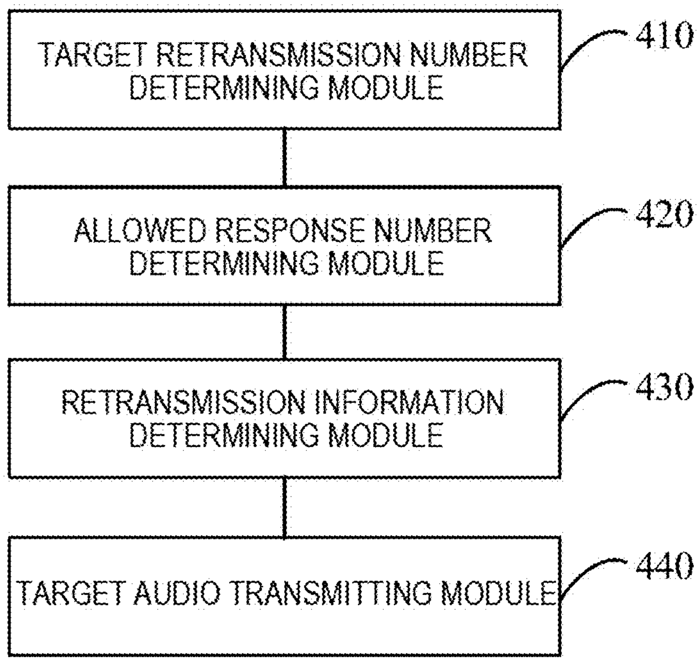
FIG. 4 is a schematic structural diagram of an apparatus for transmitting audio according to an embodiment of the present disclosure.

FIG. 4 is a schematic structural diagram of an apparatus for transmitting audio according to an embodiment of the present disclosure. The apparatus comprises: a target retransmission number determining module 410, an allowed response number determining module 420, a retransmission information determining module 430, and a target audio transmitting module 440.

The target retransmission number determining module 410 is configured to determine a target number of retransmissions corresponding to current target audio to be transmitted, based on a current network packet loss rate and an audio packet anti-loss rate. The allowed response number determining module 420 is configured to determine a current allowed number of responses corresponding to a retransmission mode of a negative acknowledgement, based on a current network round-trip delay and a predetermined allowed delay.

The retransmission information determining module 430 is configured to determine a target number of redundancies corresponding to a forward redundancy retransmission mode and a target retransmission delay corresponding to the retransmission mode of the negative acknowledgment, based on the target number of retransmissions, the predetermined allowed delay, the current allowed number of responses, and an allowed number of redundancies corresponding to a forward redundancy retransmission mode. The target audio transmitting module 440 is configured to transmit the target audio based on the target number of redundancies and the target retransmission delay.

According to the embodiment of the disclosure, a target number of retransmissions corresponding to current target audio to be transmitted is determined based on a current network packet loss rate and an audio packet anti-loss rate; a current allowed number of responses corresponding to a retransmission mode of a negative acknowledgement is determined based on a current network round-trip delay and a predetermined allowed delay; a target number of redundancies corresponding to a forward redundancy retransmission mode and a target retransmission delay corresponding to the retransmission mode of the negative acknowledgment are determined based on the target number of retransmissions, the predetermined allowed delay, the current allowed number of responses, and an allowed number of redundancies corresponding to a forward redundancy retransmission mode; and the target audio is transmitted based on the target number of redundancies and the target retransmission delay. It can effectively control the redundancy of target audio transmission. Further, transmitting target audio based on target retransmission delay can effectively control the number of negative response retransmissions, thus meeting low delay requirements. By combining forward redundancy retransmission and negative response retransmission, it can effectively balance recovery delay and redundancy, thereby reducing redundancy while meeting low delay requirements and ensuring weak network countermeasure effects.

Based on the foregoing technical solution, the predetermined allowed delay comprises: a first allowed delay and a second allowed delay, and the second allowed delay is greater than the first allowed delay;

The allowed response number determining module 420 is specifically configured to:

- determine a first allowed number of responses corresponding to the retransmission mode of the negative acknowledgement, based on the current network round-trip delay and the first allowed delay; and determine a second allowed number of responses corresponding to the retransmission mode of the negative acknowledgement, based on the current network round-trip delay and the second allowed delay.

Based on the foregoing technical solution, the retransmission information determining module 430 comprises:

- a first allowed number determining sub-module, configured to: add the first allowed number of responses and the allowed number of redundancies corresponding to the forward redundancy retransmission mode to obtain the first allowed number;
- a second allowed number determining sub-module, configured to: add the second allowed number of responses and the allowed number of redundancies corresponding to the forward redundant retransmission mode to obtain the second allowed number;
- a number comparison sub-module, configured to: compare the target number of retransmissions with the first allowed number of responses, the first allowed number, and the second allowed number, respectively;
- a target redundancy number determining sub-module, configured to: perform redundancy minimization based on a result of the comparing, to determine the target number of redundancies corresponding to the forward redundancy retransmission mode; and
- a target retransmission delay determining sub-module, configured to: determine the target retransmission delay corresponding to the retransmission mode of the negative acknowledgement, based on the result comparing, the first allowed delay, and the second allowed delay.

Based on the forgoing technical solution, the target redundancy number determining sub-module comprises:

- a first number determining sub-module, configured to: in response to the target number of retransmissions being less than or equal to the first allowed response number, determine that the target number of redundancies corresponding to the forward redundancy retransmission mode is 0;
- a second number determining sub-module, configured to: in response to the target number of retransmissions being greater than the first allowed number of responses and less than or equal to the first allowed number, determine, based on the target number of retransmissions and the first allowed number of responses, the target number of redundancies corresponding to the forward redundancy retransmission mode;
- a third number determining sub-module, configured to: in response to the target number of retransmissions being greater than the first allowed number and less than or equal to the second allowed number, determine that the target number of redundancies corresponding to the forward redundancy retransmission mode is the allowed number of redundancies; and a fourth number determining sub-module, configured to: in response to the target number of retransmissions being greater than the second allowed number, determine, based on the second allowed number of responses and the allowed number of redundancies, the target number of redundancies corresponding to the forward redundancy retransmission mode.

Based on the forgoing technical solution, the fourth number determining sub-module comprises:

a first determining subunit, configured to: in response to the second allowed number of responses being less than or equal to a predetermined number, determine that the target number of redundancies corresponding to the forward redundancy retransmission mode is the allowed number of redundancies; and a second determining subunit, configured to: in response to the second allowed number of responses being greater than the predetermined number, determine that the target number of redundancies corresponding to the forward redundancy retransmission mode is 0, and determine, based on the allowed number of redundancies and the current network packet loss rate, the target number of redundancies corresponding to a delay forward redundancy retransmission mode, wherein the delay forward redundancy retransmission mode is a mode for performing a forward redundancy retransmission after a negative acknowledgment signal is received for the first time.

Based on the forgoing technical solution, the second determining subunit is specifically configured to:

divide the allowed number of redundancies by the current network packet loss rate, and determine an obtained result of the dividing as the target number of redundancies corresponding to the delay forward redundancy retransmission mode.

Based on the forgoing technical solution, the target retransmission delay determining sub-module comprises:

a first delay determining unit, configured to: in response to the target number of retransmissions being less than or equal to the first allowed number, determine that the target retransmission delay corresponding to the retransmission mode of the negative acknowledgment is the first allowed delay;

a first delay determining unit, configured to: in response to the target number of retransmissions being greater than the first allowed number and less than or equal to the second allowed number, determine the target retransmission delay corresponding to the retransmission mode of the negative acknowledgment, based on the target number of retransmissions, the allowed number of redundancies, and the current network round-trip delay; and a third delay determining unit, configured to: in response to the target number of retransmissions being greater than the second allowed number, determine that the target retransmission delay corresponding to the retransmission mode of the negative acknowledgment is the second allowed delay.

Based on the forgoing technical solution, the second delay determination unit is specifically configured to:

determine the retransmission number of the negative acknowledgement based on the target number of retransmissions and the allowed number of redundancies; and determine the target retransmission delay corresponding to the retransmission mode of the negative acknowledgement based on the current network round-trip delay and the retransmission number of negative acknowledgement.

Based on the forgoing technical solution, the target audio transmitting module 440 comprises:

a forward redundance transmission sub-module, configured to: perform redundancy processing on an audio data packet of the target audio based on the target number of redundancies, and transmitting the audio data packet with redundancies; and a negative acknowledgement retransmission sub-module, configured to: in response to the current transmission delay being less than or equal to the target retransmission delay, retransmit a lost audio data packet responsive to a received negative acknowledgement signal.

Based on the forgoing technical solution, the negative acknowledgement retransmission sub-module is specifically configured to:

in response to a firstly received negative acknowledgement signal, perform redundancy processing on the lost audio data packet, based on the target number of redundancies corresponding to the delay forward redundant retransmission mode, and retransmit the lost audio data packet with redundancies; and in response to a subsequently received negative acknowledgement signal, retransmit the lost audio data packet.

The apparatus for transmitting audio provided in the embodiments of the present disclosure may perform the method for transmitting audio provided by any embodiment of the present disclosure, and has functional modules and beneficial effects corresponding to performing the method for transmitting audio.

It should be noted that the units and modules comprised in the foregoing apparatus are only divided according to the function logic, but are not limited to the foregoing division, as long as the corresponding functions can be implemented. In addition, the specific names of the functional units are merely for ease of distinguishing, and are not intended to limit the protection scope of the embodiments of the present disclosure.

Figure 5:
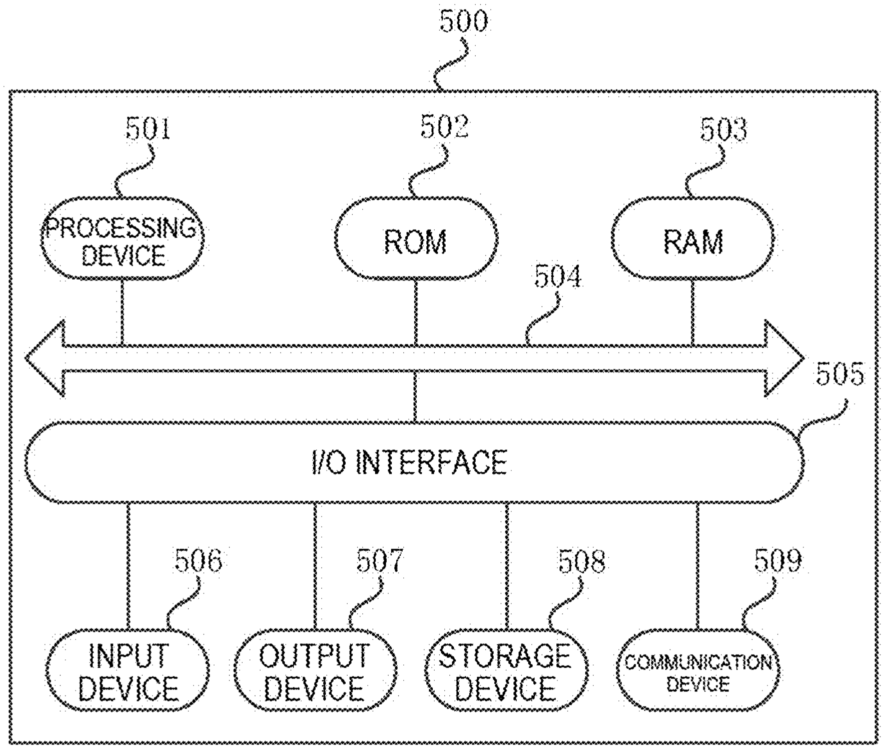
FIG. 5 is a schematic structural diagram of an electronic device according to an embodiment of the present disclosure.

FIG. 5 is a schematic structural diagram of an electronic device according to an embodiment of this disclosure. Reference now is made with FIG. 5, which is a schematic structural diagram of an electronic device (such as the terminal device or server in FIG. 5) 500 suitable for implementing the embodiments of the disclosure. The terminal device in the embodiments of the disclosure may comprise, but not limited to, a mobile terminal such as a mobile phone, a notebook computer, a digital broadcast receiver, a PDA (personal digital assistant), a PAD (portable Android device), a PMP (portable media player), an in-vehicle terminal (for example, an in-vehicle navigation terminal), and a fixed terminal such as a digital TV, a desktop computer, or the like. The electronic device shown in FIG. 5 is merely an example, and should not impose any limitation on the functionality and scope of use of the embodiments of the disclosure.

As shown in FIG. 5, the electronic device 500 may include a processing device (for example, a central processing unit, a graphics processor, etc.) 501, and the processing device 501 may perform various appropriate actions and processing according to a program stored in a read-only memory (ROM) 502 or a program loaded into a random access memory (RAM) 503 from a storage device 508. In the RAM 503, various programs and data required by the operation of the electronic device 500 are also stored. The processing device 501, the ROM 502, and the RAM 503 are connected to each other through a bus 504. An input/output (I/O) interface 505 is also connected to the bus 504.

Generally, the following devices may be connected to the I/O interface 505: an input device 506 including, for example, a touch screen, a touch pad, a keyboard, a mouse, a camera, a microphone, an accelerometer, a gyroscope, and the like; an output device 507 including, for example, a liquid crystal display (LCD), a speaker, a vibrator, and the like; a storage device 508 including, for example, a magnetic tape, a hard disk, and the like; and a communication device 509. The communication device 509 may allow the electronic device 500 to communicate wirelessly or wired with other devices to exchange data. While FIG. 5 shows an electronic device 500 having various devices, it should be understood that it is not required to implement or have all illustrated devices. More or fewer devices may alternatively be implemented or provided.

In particular, according to an embodiment of this disclosure, the process described above with reference to the flowchart may be implemented as a computer software program. For example, embodiments of the disclosure comprise a computer program product comprising a computer program embodied on a non-transitory computer readable medium, the computer program comprising program code for performing a method shown in flowchart. In such embodiments, the computer program may be downloaded and installed from the network through the communication device 509, or installed from the storage device 508, or from the ROM 502. When the computer program is executed by the processing device 501, the foregoing functions defined in the method of the embodiments of the present disclosure are performed.

The names of messages or information interacted between a plurality of devices in embodiments of the present disclosure are for illustrative purposes only, and are not intended to limit the scope of such messages or information.

The electronic device provided by the embodiments of the disclosure and the data communication method provided in the foregoing embodiments belong to the same inventive concept, and technical details not described in detail in this embodiment may refer to the foregoing embodiments, and this embodiment has the same beneficial effects as the foregoing embodiments.

An embodiment of the present disclosure provides a computer storage medium, having a computer program stored thereon, where the computer program, when executed by a processor, implements the method for transmitting audio provided in the foregoing embodiments.

It should be noted that the computer readable medium described above may be a computer readable signal medium, or a computer readable storage medium, or a combination of the both. The computer-readable storage medium may be, for example, but not limited to, an electrical, magnetic, optical, electromagnetic, infrared, or semiconductor system, apparatus, or device, or a combination thereof. Examples of the computer-readable storage medium may comprise, but not limited to: an electrical connection having one or more wires, a portable computer diskette, a hard disk, a random access memory (RAM), a read-only memory (ROM), an erasable programmable read-only memory (such as an electronic programmable read-only memory (EPROM) or flash memory), an optical fiber, a portable compact disc read-only memory (CD-ROM), an optical storage device, a magnetic storage device, or a suitable combination thereof. In the disclosure, a computer-readable storage medium may be a tangible medium containing or storing a program that may be used by or in connection with an instruction execution system, apparatus, or device. In the disclosure, a computer readable signal medium may comprise a data signal propagated in baseband or as part of a carrier, where the computer readable program code is carried. Such propagated data signals may take a variety of forms, comprising but not limited to electromagnetic signals, optical signals, or suitable combinations thereof.

The computer readable signal medium may also be any computer readable medium other than a computer readable storage medium that may send, propagate, or transmit a program for use by or in connection with an instruction execution system, apparatus, or device. The program code embodied on the computer-readable medium may be transmitted by any suitable medium, comprising but not limited to wires, optical cables, RF (radio frequency), and the like, or suitable combinations thereof.

In some implementations, the client, server may communicate using any currently known or future developed network protocol, such as HTTP (Hypertext Transfer Protocol), and may be interconnected with any form or medium of digital data communication (e.g., a communication network). Examples of communication networks include Local Area Networks (LANs), Wide Area Networks (WANs), Internet networks (e.g., the Internet), and peer-to-peer networks (e.g., ad hoc peer-to-peer networks), as well as currently known or future developed networks.

The computer-readable medium described above may be comprised in the electronic device; or may be separately present without being assembled into the electronic device.

The computer readable medium carries one or more programs, and when one or more programs is executed by the electronic device, the electronic device is caused to: determine a target number of retransmissions corresponding to current target audio to be transmitted, based on a current network packet loss rate and an audio packet anti-loss rate; determine a current allowed number of responses corresponding to a retransmission mode of a negative acknowledgement, based on a current network round-trip delay and a predetermined allowed delay; determine a target number of redundancies corresponding to a forward redundancy retransmission mode and a target retransmission delay corresponding to the retransmission mode of the negative acknowledgment, based on the target number of retransmissions, the predetermined allowed delay, the current allowed number of responses, and an allowed number of redundancies corresponding to a forward redundancy retransmission mode; and transmit the target audio based on the target number of redundancies and the target retransmission delay.

Computer program code for performing the operations of the present disclosure may be written in one or more programming languages, including, but not limited to, object-oriented programming languages such as Java, Smalltalk, C++, and conventional procedural programming languages, such as the "C" language or similar programming languages. The program code may execute entirely on a user computer, partially on a user computer, as a stand-alone software package, partially on a user computer and partially on a remote computer, or entirely on a remote computer or server. In the case of a remote computer involved, the remote computer may be connected to the user computer through any kind of network, including a local area network (LAN) or a wide area network (WAN), or may be connected to an external computer (e.g., connected through the Internet using an Internet service provider).

The flowcharts and block diagrams in the figures illustrate architecture, functionality, and operation of possible implementations of systems, methods, and computer program products according to various embodiments of the present disclosure. In this regard, each block in the flowchart or block diagram may represent a module, program segment, or portion of code that comprises one or more executable instructions for implementing the specified logical function. It should also be noted that in some alternative implementations, the functions noted in the blocks may also occur in a different order than that illustrated in the figures. For example, two consecutively represented blocks may actually be performed substantially in parallel, which may sometimes be performed in the reverse order, depending on the functionality involved. It is also noted that each block in the block diagrams and/or flowcharts, as well as combinations of blocks in the block diagrams and/or flowcharts, may be implemented with a dedicated hardware-based system that performs the specified functions or operations, or may be implemented in a combination of dedicated hardware and computer instructions.

The units involved in the embodiments of the present disclosure may be implemented in software, or may be implemented in hardware. The name of the module does not constitute a limitation on the unit itself in some cases. For example, the first obtaining unit may be described as "a unit that obtains at least two Internet Protocol addresses".

The functions described above may be performed, at least in part, by one or more hardware logic components. For example, without limitation, exemplary types of hardware logic components that may be used comprise: field programmable gate arrays (FPGAs), application specific integrated circuits (ASICs), application specific standard products (ASSPs), system-on-a-chip (SOCs), complex programmable logic devices (CPLDs), and the like.

In the context of the present disclosure, a machine-readable medium may be a tangible medium that may contain or store a program for use by or in connection with an instruction execution system, apparatus, or device. The server-readable medium may be a server-readable signal medium or a server-readable storage medium. The server-readable medium may comprise electronic, magnetic, optical, electromagnetic, infrared, or semiconductor systems, apparatus, or devices, or any suitable combination of the foregoing. The examples of server-readable storage media may include electrical connections based on one or more lines, portable computer disks, hard disks, random access memory (RAM), read-only memory (ROM), erasable programmable read-only memory (EPROM or Flash memory), optical fibers, portable compact disc read-only memory (CD-ROM), optical storage devices, magnetic storage devices, or any suitable combination of the foregoing.

According to one or more embodiments of the present disclosure, Example 1 provides a method for transmitting audio, comprising:

- determining a target number of retransmissions corresponding to current target audio to be transmitted, based on a current network packet loss rate and an audio packet anti-loss rate;
- determining a current allowed number of responses corresponding to a retransmission mode of a negative acknowledgement, based on a current network round-trip delay and a predetermined allowed delay;
- determining a target number of redundancies corresponding to a forward redundancy retransmission mode and a target retransmission delay corresponding to the retransmission mode of the negative acknowledgment, based on the target number of retransmissions, the predetermined allowed delay, the current allowed number of responses, and an allowed number of redundancies corresponding to a forward redundancy retransmission mode; and
- transmitting the target audio based on the target number of redundancies and the target retransmission delay.

According to one or more embodiments of the present disclosure, Example 2 provides a method for transmitting audio, further comprises:

Optionally, the predetermined allowed delay comprises: a first allowed delay and a second allowed delay, and the second allowed delay is greater than the first allowed delay;

- determining the current allowed number of responses corresponding to the retransmission mode of the negative acknowledgement, based on the current network round-trip delay and the predetermined allowed delay comprises:
- determining a first allowed number of responses corresponding to the retransmission mode of the negative acknowledgement, based on the current network round-trip delay and the first allowed delay; and
- determining a second allowed number of responses corresponding to the retransmission mode of the negative acknowledgement, based on the current network round-trip delay and the second allowed delay.

According to one or more embodiments of the present disclosure, Example 3 provides a method for transmitting audio, further comprises:

- Optionally, determining the target number of redundancies corresponding to the forward redundancy retransmission mode and the target retransmission delay corresponding to the retransmission mode of the negative acknowledgment, based on the target number of retransmissions, the predetermined allowed delay, the current allowed number of responses, and the allowed number of redundancies corresponding to the forward redundancy retransmission mode comprises:
- adding the first allowed number of responses and the allowed number of redundancies corresponding to the forward redundancy retransmission mode to obtain the first allowed number;
- adding the second allowed number of responses and the allowed number of redundancies corresponding to the forward redundancy retransmission mode to obtain the second allowed number;
- comparing the target number of retransmissions with the first allowed number of responses, the first allowed number, and the second allowed number, respectively;
- performing redundancy minimization based on a result of the comparing, to determine the target number of redundancies corresponding to the forward redundancy retransmission mode; and
- determining the target retransmission delay corresponding to the retransmission mode of the negative acknowledgement, based on the result comparing, the first allowed delay, and the second allowed delay.

According to one or more embodiments of the present disclosure, Example 4 provides a method for transmitting audio, further comprises:

- Optionally, performing the redundancy minimization based on the result of the comparing, to determine the target redundancy number corresponding to the forward redundancy retransmission mode comprises:

in response to the target number of retransmissions being less than or equal to the first allowed number of responses, determining that the target number of redundancies corresponding to the forward redundancy retransmission mode is 0;

in response to the target number of retransmissions being greater than the first allowed number of responses and less than or equal to the first allowed number, determining, based on the target number of retransmissions and the first allowed number of responses, the target number of redundancies corresponding to the forward redundancy retransmission mode;

in response to the target number of retransmissions being greater than the first allowed number and less than or equal to the second allowed number, determining that the target number of redundancies corresponding to the forward redundancy retransmission mode is the allowed number of redundancies; and in response to the target number of retransmissions being greater than the second allowed number, determining, based on the second allowed number of responses and the allowed number of redundancies, the target number of redundancies corresponding to the forward redundancy retransmission mode.

According to one or more embodiments of the present disclosure, Example 5 provides a method for transmitting audio, further comprises:

Optionally, determining, based on the second allowed number of responses and the allowed number of redundancies, the target number of redundancies corresponding to the forward redundancy retransmission mode comprises:

in response to the second allowed number of responses being less than or equal to a predetermined number, determining that the target number of redundancies corresponding to the forward redundancy retransmission mode is the allowed number of redundancies; and in response to the second allowed number of responses being greater than the predetermined number, determining that the target number of redundancies corresponding to the forward redundancy retransmission mode is 0, and determining, based on the allowed number of redundancies and the current network packet loss rate, the target number of redundancies corresponding to a delay forward redundancy retransmission mode, wherein the delay forward redundancy retransmission mode is a mode for performing a forward redundancy retransmission after a negative acknowledgment signal is received for the first time.

According to one or more embodiments of the present disclosure, Example 6 provides a method for transmitting audio, further comprises:

Optionally, determining, based on the allowed number of redundancies and the current network packet loss rate, the target number of redundancies corresponding to the delay forward redundancy retransmission mode comprises:

dividing the allowed number of redundancies by the current network packet loss rate, and determining an obtained result of the dividing as the target number of redundancies corresponding to the delay forward redundancy retransmission mode.

According to one or more embodiments of the present disclosure, Example 7 provides a method for transmitting audio, further comprises:

Optionally, determining the target retransmission delay corresponding to the retransmission mode of the negative acknowledgement based on the result of the comparing, the first allowed delay, and the second allowed delay comprises:

in response to the target number of retransmissions being less than or equal to the first allowed number, determining that the target retransmission delay corresponding to the retransmission mode of the negative acknowledgment is the first allowed delay;

in response to the target number of retransmissions being greater than the first allowed number and less than or equal to the second allowed number, determining the target retransmission delay corresponding to the retransmission mode of the negative acknowledgment, based on the target number of retransmissions, the allowed number of redundancies, and the current network round-trip delay; and in response to the target number of retransmissions being greater than the second allowed number, determining that the target retransmission delay corresponding to the retransmission mode of the negative acknowledgment is the second allowed delay.

According to one or more embodiments of the present disclosure, Example 4 provides a method for transmitting audio, further comprises:

Optionally, determining the target retransmission delay corresponding to the retransmission mode of the negative acknowledgment based on the target number of retransmissions, the allowed number of redundancies, and the current network round-trip delay comprises:

determining the retransmission number of the negative acknowledgement based on the target number of retransmissions and the allowed number of redundancies; and determining the target retransmission delay corresponding to the retransmission mode of the negative acknowledgement based on the current network round-trip delay and the retransmission number of negative acknowledgement.

According to one or more embodiments of the present disclosure, Example 9 provides a method for transmitting audio, further comprises:

Optionally, transmitting the target audio based on the target number of redundancies and the target retransmission delay comprises:

performing redundancy processing on an audio data packet of the target audio based on the target number of redundancies, and transmitting the audio data packet with redundancies; and in response to the current transmission delay being less than or equal to the target retransmission delay, retransmitting a lost audio data packet responsive to a received negative acknowledgement signal.

According to one or more embodiments of the present disclosure, Example 10 provides a method for transmitting audio, further comprises:

Optionally, retransmitting the lost audio data packet responsive to the received negative acknowledgement signal comprises:

in response to a firstly received negative acknowledgement signal, performing redundancy processing on the lost audio data packet, based on the target number of redundancies corresponding to the delay forward redundancy retransmission mode, and retransmitting the lost audio data packet with redundancies; and in response to a subsequently received negative acknowledgement signal, retransmitting the lost audio data packet.

According to one or more embodiments of the present disclosure, Example 11 provides an apparatus for transmitting audio, comprising:

a target retransmission number determining module, configured to determine a target number of retransmissions corresponding to current target audio to be transmitted, based on a current network packet loss rate and an audio packet anti-loss rate;

an allowed number of responses determining module, configured to determine a current allowed number of responses corresponding to a retransmission mode of a negative acknowledgement, based on a current network round-trip delay and a predetermined allowed delay;

a retransmission information determining module, configured to determine a target number of redundancies corresponding to a forward redundancy retransmission mode and a target retransmission delay corresponding to a retransmission mode of the negative acknowledgment, based on the target number of retransmissions, the predetermined allowed delay, the current allowed number of responses, and the allowed number of redundancies corresponding to a forward redundancy retransmission mode; and a target audio transmitting module, configured to transmit the target audio based on the target number of redundancies and the target retransmission delay.

The above description is merely an illustration of the preferred embodiments of the present disclosure and the principles of the applied technology. It should be understood by those skilled in the art that the disclosure in the present disclosure is not limited to the technical solutions of the specific combination of the above technical features, and should also cover other technical solutions formed by any combination of the above technical features or their equivalent features without departing from the above disclosed concept. For example, the technical solution formed by mutually replacing the above features and the technical features have similar functions disclosed (but not limited to) in the present disclosure.

Further, while operations are depicted in a particular order, this should not be understood to require that these operations be performed in the particular order shown or in sequential order. In certain circumstances, multitasking and parallel processing may be advantageous. Likewise, while several specific implementation details are comprised in the discussion above, these should not be construed as limiting the scope of the present disclosure. Certain features described in the context of separate embodiments may also be implemented in combination in a single embodiment. Conversely, the various features described in the context of a single embodiment may also be implemented in multiple embodiments either individually or in any suitable subcombination.

Although the present subject matter has been described in language specific to structural features and/or methodological acts, it is to be understood that the subject matter defined in the appended claims is not necessarily limited to the specific features or acts described above. Rather, the specific features and acts described above are merely exemplary forms of implementing the claims.

What is claimed is:

1. A method for transmitting audio, comprising:

determining a number of retransmissions corresponding to current audio to be transmitted, based on a current network packet loss rate and an audio packet anti-loss rate;

determining a current allowed number of responses corresponding to a retransmission mode of a negative acknowledgement, based on a current network round-trip delay and a predetermined allowed delay;

determining a number of redundancies corresponding to a forward redundancy retransmission mode and a retransmission delay corresponding to the retransmission mode of the negative acknowledgment, based on the number of retransmissions, the predetermined allowed delay, the current allowed number of responses, and an allowed number of redundancies corresponding to a forward redundancy retransmission mode; and transmitting the audio based on the number of redundancies and the retransmission delay;

wherein the predetermined allowed delay comprises: a first allowed delay and a second allowed delay, and the second allowed delay is greater than the first allowed delay:

determining the current allowed number of responses corresponding to the retransmission mode of the negative acknowledgement, based on the current network round-trip delay and the predetermined allowed delay comprises:

determining a first allowed number of responses corresponding to the retransmission mode of the negative acknowledgement, based on the current network round-trip delay and the first allowed delay; and determining a second allowed number of responses corresponding to the retransmission mode of the negative acknowledgement, based on the current network round-trip delay and the second allowed delay:

wherein determining the number of redundancies corresponding to the forward redundancy retransmission mode and the retransmission delay corresponding to the retransmission mode of the negative acknowledgment, based on the number of retransmissions, the predetermined allowed delay, the current allowed number of responses, and the allowed number of redundancies corresponding to the forward redundancy retransmission mode comprises:

adding the first allowed number of responses and the allowed number of redundancies corresponding to the forward redundancy retransmission mode to obtain the first allowed number;

adding the second allowed number of responses and the allowed number of redundancies corresponding to the forward redundancy retransmission mode to obtain the second allowed number;

comparing the number of retransmissions with the first allowed number of responses, the first allowed number, and the second allowed number, respectively;

performing redundancy minimization based on a result of the comparing, to determine the number of redundancies corresponding to the forward redundancy retransmission mode; and determining the retransmission delay corresponding to the retransmission mode of the negative acknowledgement, based on the result of the comparing, the first allowed delay, and the second allowed delay.

2. The method for transmitting audio according to claim 1, wherein performing the redundancy minimization based on the result of the comparing, to determine the number of redundancies corresponding to the forward redundancy retransmission mode comprises:

in response to the number of retransmissions being less than or equal to the first allowed number of responses, determining that the number of redundancies corresponding to the forward redundancy retransmission mode is 0;

in response to the number of retransmissions being greater than the first allowed number of responses and less than or equal to the first allowed number, determining, based on the number of retransmissions and the first allowed number of responses, the number of redundancies corresponding to the forward redundancy retransmission mode;

in response to the number of retransmissions being greater than the first allowed number and less than or equal to the second allowed number, determining that the number of redundancies corresponding to the forward redundancy retransmission mode is the allowed number of redundancies; and in response to the number of retransmissions being greater than the second allowed number, determining, based on the second allowed number of responses and the allowed number of redundancies, the number of redundancies corresponding to the forward redundancy retransmission mode.

3. The method for transmitting audio according to claim 2, wherein determining, based on the second allowed number of responses and the allowed number of redundancies, the number of redundancies corresponding to the forward redundancy retransmission mode comprises:

in response to the second allowed number of responses being less than or equal to a predetermined number, determining that the number of redundancies corresponding to the forward redundancy retransmission mode is the allowed number of redundancies; and in response to the second allowed number of responses being greater than the predetermined number, determining that the number of redundancies corresponding to the forward redundancy retransmission mode is 0, and determining, based on the allowed number of redundancies and the current network packet loss rate, the number of redundancies corresponding to a delay forward redundancy retransmission mode, wherein the delay forward redundancy retransmission mode is a mode for performing a forward redundancy retransmission after a negative acknowledgment signal is received for the first time.

4. The method for transmitting audio according to claim 3, wherein determining, based on the allowed number of redundancies and the current network packet loss rate, the number of redundancies corresponding to the delay forward redundancy retransmission mode comprises:

dividing the allowed number of redundancies by the current network packet loss rate, and determining an obtained result of the dividing as the number of redundancies corresponding to the delay forward redundancy retransmission mode.

5. The method for transmitting audio according to claim 1, wherein determining the retransmission delay corresponding to the retransmission mode of the negative acknowledgement based on the result of the comparing, the first allowed delay, and the second allowed delay comprises:

in response to the number of retransmissions being less than or equal to the first allowed number, determining that the retransmission delay corresponding to the retransmission mode of the negative acknowledgment is the first allowed delay;

in response to the number of retransmissions being greater than the first allowed number and less than or equal to the second allowed number, determining the retransmission delay corresponding to the retransmission mode of the negative acknowledgment, based on the number of retransmissions, the allowed number of redundancies, and the current network round-trip delay; and in response to the number of retransmissions being greater than the second allowed number, determining that the retransmission delay corresponding to the retransmission mode of the negative acknowledgment is the second allowed delay.

6. The method for transmitting audio according to claim 5, wherein determining the retransmission delay corresponding to the retransmission mode of the negative acknowledgment based on the number of retransmissions, the allowed number of redundancies, and the current network round-trip delay comprises:

determining a retransmission number of the negative acknowledgement based on the number of retransmissions and the allowed number of redundancies; and determining the retransmission delay corresponding to the retransmission mode of the negative acknowledgement based on the current network round-trip delay and the retransmission number of the negative acknowledgement.

7. The method for transmitting audio according to claim 1, wherein transmitting the audio based on the number of redundancies and the retransmission delay comprises:

performing redundancy processing on an audio data packet of the audio based on the number of redundancies, and transmitting the audio data packet with redundancies; and in response to the current transmission delay being less than or equal to the retransmission delay, retransmitting a lost audio data packet responsive to a received negative acknowledgement signal.

8. The method for transmitting audio according to claim 7, wherein retransmitting the lost audio data packet responsive to the received negative acknowledgement signal comprises:

in response to a firstly received negative acknowledgement signal, performing redundancy processing on the lost audio data packet, based on the number of redundancies corresponding to the delay forward redundancy retransmission mode, and retransmitting the lost audio data packet with redundancies; and in response to a subsequently received negative acknowledgement signal, retransmitting the lost audio data packet.

9. An electronic device, comprising:

one or more processors;

a storage device storing one or more programs;

the one or more programs, when executed by the one or more processors, causing the one or more processors implement the acts comprising:

determining a number of retransmissions corresponding to current audio to be transmitted, based on a current network packet loss rate and an audio packet anti-loss rate;

determining a current allowed number of responses corresponding to a retransmission mode of a negative acknowledgement, based on a current network round-trip delay and a predetermined allowed delay;

determining a number of redundancies corresponding to a forward redundancy retransmission mode and a retransmission delay corresponding to the retransmission mode of the negative acknowledgment, based on the number of retransmissions, the predetermined allowed delay, the current allowed number of responses, and an allowed number of redundancies corresponding to a forward redundancy retransmission mode; and transmitting the audio based on the number of redundancies and the retransmission delay;

wherein the predetermined allowed delay comprises: a first allowed delay and a second allowed delay, and the second allowed delay is greater than the first allowed delay:

determining the current allowed number of responses corresponding to the retransmission mode of the negative acknowledgement, based on the current network round-trip delay and the predetermined allowed delay comprises:

determining a first allowed number of responses corresponding to the retransmission mode of the negative acknowledgement, based on the current network round-trip delay and the first allowed delay; and determining a second allowed number of responses corresponding to the retransmission mode of the negative acknowledgement, based on the current network round-trip delay and the second allowed delay;

wherein determining the number of redundancies corresponding to the forward redundancy retransmission mode and the retransmission delay corresponding to the retransmission mode of the negative acknowledgment, based on the number of retransmissions, the predetermined allowed delay, the current allowed number of responses, and the allowed number of redundancies corresponding to the forward redundancy retransmission mode comprises:

adding the first allowed number of responses and the allowed number of redundancies corresponding to the forward redundancy retransmission mode to obtain the first allowed number;

adding the second allowed number of responses and the allowed number of redundancies corresponding to the forward redundancy retransmission mode to obtain the second allowed number;

comparing the number of retransmissions with the first allowed number of responses, the first allowed number, and the second allowed number, respectively;

performing redundancy minimization based on a result of the comparing, to determine the number of redundancies corresponding to the forward redundancy retransmission mode; and determining the retransmission delay corresponding to the retransmission mode of the negative acknowledgement, based on the result of the comparing, the first allowed delay, and the second allowed delay.

10. The electronic device according to claim 9, wherein performing the redundancy minimization based on the result of the comparing, to determine the number of redundancies corresponding to the forward redundancy retransmission mode comprises:

in response to the number of retransmissions being less than or equal to the first allowed number of responses, determining that the number of redundancies corresponding to the forward redundancy retransmission mode is 0;

in response to the number of retransmissions being greater than the first allowed number of responses and less than or equal to the first allowed number, determining, based on the number of retransmissions and the first allowed number of responses, the number of redundancies corresponding to the forward redundancy retransmission mode;

in response to the number of retransmissions being greater than the first allowed number and less than or equal to the second allowed number, determining that the number of redundancies corresponding to the forward redundancy retransmission mode is the allowed number of redundancies; and in response to the number of retransmissions being greater than the second allowed number, determining, based on the second allowed number of responses and the allowed number of redundancies, the number of redundancies corresponding to the forward redundancy retransmission mode.

11. The electronic device according to claim 10, wherein determining, based on the second allowed number of responses and the allowed number of redundancies, the number of redundancies corresponding to the forward redundancy retransmission mode comprises:

in response to the second allowed number of responses being less than or equal to a predetermined number, determining that the number of redundancies corresponding to the forward redundancy retransmission mode is the allowed number of redundancies; and in response to the second allowed number of responses being greater than the predetermined number, determining that the number of redundancies corresponding to the forward redundancy retransmission mode is 0, and determining, based on the allowed number of redundancies and the current network packet loss rate, the number of redundancies corresponding to a delay forward redundancy retransmission mode, wherein the delay forward redundancy retransmission mode is a mode for performing a forward redundancy retransmission after a negative acknowledgment signal is received for the first time.

12. The electronic device according to claim 11, wherein determining, based on the allowed number of redundancies and the current network packet loss rate, the number of redundancies corresponding to the delay forward redundancy retransmission mode comprises:

dividing the allowed number of redundancies by the current network packet loss rate, and determining an obtained result of the dividing as the number of redundancies corresponding to the delay forward redundancy retransmission mode.

13. The electronic device according to claim 9, wherein determining the retransmission delay corresponding to the retransmission mode of the negative acknowledgement based on the result of the comparing, the first allowed delay, and the second allowed delay comprises:

in response to the number of retransmissions being less than or equal to the first allowed number, determining that the retransmission delay corresponding to the retransmission mode of the negative acknowledgment is the first allowed delay;

in response to the number of retransmissions being greater than the first allowed number and less than or equal to the second allowed number, determining the retransmission delay corresponding to the retransmission mode of the negative acknowledgment, based on the number of retransmissions, the allowed number of redundancies, and the current network round-trip delay; and in response to the number of retransmissions being greater than the second allowed number, determining that the retransmission delay corresponding to the retransmission mode of the negative acknowledgment is the second allowed delay.

14. The electronic device according to claim 13, wherein determining the retransmission delay corresponding to the retransmission mode of the negative acknowledgment based on the number of retransmissions, the allowed number of redundancies, and the current network round-trip delay comprises:

determining a retransmission number of the negative acknowledgement based on the number of retransmissions and the allowed number of redundancies; and determining the retransmission delay corresponding to the retransmission mode of the negative acknowledgement based on the current network round-trip delay and the retransmission number of the negative acknowledgement.

15. The electronic device according to claim 9, wherein transmitting the audio based on the number of redundancies and the retransmission delay comprises:

performing redundancy processing on an audio data packet of the audio based on the number of redundancies, and transmitting the audio data packet with redundancies; and in response to the current transmission delay being less than or equal to the retransmission delay, retransmitting a lost audio data packet responsive to a received negative acknowledgement signal.

16. A non-transitory storage medium comprising computer-executable instructions, wherein the computer-executable instructions, when executed by a computer processor, perform a method comprising:

determining a number of retransmissions corresponding to current audio to be transmitted, based on a current network packet loss rate and an audio packet anti-loss rate;

determining a current allowed number of responses corresponding to a retransmission mode of a negative acknowledgement, based on a current network round-trip delay and a predetermined allowed delay;

determining a number of redundancies corresponding to a forward redundancy retransmission mode and a retransmission delay corresponding to the retransmission mode of the negative acknowledgment, based on the number of retransmissions, the predetermined allowed delay, the current allowed number of responses, and an allowed number of redundancies corresponding to a forward redundancy retransmission mode; and transmitting the audio based on the number of redundancies and the retransmission delay;

wherein the predetermined allowed delay comprises: a first allowed delay and a second allowed delay, and the second allowed delay is greater than the first allowed delay;

determining the current allowed number of responses corresponding to the retransmission mode of the negative acknowledgement, based on the current network round-trip delay and the predetermined allowed delay comprises:

determining a first allowed number of responses corresponding to the retransmission mode of the negative acknowledgement, based on the current network round-trip delay and the first allowed delay; and determining a second allowed number of responses corresponding to the retransmission mode of the negative acknowledgement, based on the current network round-trip delay and the second allowed delay:

wherein determining the number of redundancies corresponding to the forward redundancy retransmission mode and the retransmission delay corresponding to the retransmission mode of the negative acknowledgment, based on the number of retransmissions, the predetermined allowed delay, the current allowed number of responses, and the allowed number of redundancies corresponding to the forward redundancy retransmission mode comprises:

adding the first allowed number of responses and the allowed number of redundancies corresponding to the forward redundancy retransmission mode to obtain the first allowed number;

adding the second allowed number of responses and the allowed number of redundancies corresponding to the forward redundancy retransmission mode to obtain the second allowed number;

comparing the number of retransmissions with the first allowed number of responses, the first allowed number, and the second allowed number, respectively:

performing redundancy minimization based on a result of the comparing, to determine the number of redundancies corresponding to the forward redundancy retransmission mode; and determining the retransmission delay corresponding to the retransmission mode of the negative acknowledgement, based on the result of the comparing, the first allowed delay, and the second allowed delay.

* * * * *